US012540507B2

(12) United States Patent
Albertyn

(10) Patent No.: US 12,540,507 B2
(45) Date of Patent: Feb. 3, 2026

(54) UTILITY POLE STEP

(71) Applicant: Western Utility Solutions, Inc., Ladera Ranch, CA (US)

(72) Inventor: Gregory Ian Albertyn, San Juan Capistrano, CA (US)

(73) Assignee: WESTERN UTILITY SOLUTIONS, INC., Ladera Ranch, CA (US)

(*) Notice: Subject to any disclaimer, the term of this patent is extended or adjusted under 35 U.S.C. 154(b) by 1189 days.

(21) Appl. No.: 17/446,879

(22) Filed: Sep. 3, 2021

(65) Prior Publication Data

US 2022/0074267 A1 Mar. 10, 2022

Related U.S. Application Data

(60) Provisional application No. 63/075,608, filed on Sep. 8, 2020.

(51) Int. Cl.
*E06C 1/34* (2006.01)
*E06C 1/38* (2006.01)

(52) U.S. Cl.
CPC ................ *E06C 1/34* (2013.01); *E06C 1/381* (2013.01)

(58) Field of Classification Search
CPC ............... E06C 1/34; E06C 1/381; E06C 9/04
USPC ............................... 182/116, 54, 89, 90, 120
See application file for complete search history.

(56) References Cited

U.S. PATENT DOCUMENTS 543,121 A * 7/1895 Bates ................. A47G 25/0607 248/217.4
1,419,563 A * 6/1922 Horning .................... E06C 9/04 248/222.51
D100,223 S 6/1936 Morgan
3,380,697 A * 4/1968 Melcher .................... E06C 9/04 248/217.4
3,463,525 A * 8/1969 Stewart ................. F16B 45/005 411/176
4,100,997 A 7/1978 Peacock
4,697,669 A * 10/1987 Bergsten ................... E06C 9/04 182/189
4,867,272 A 9/1989 Troubridge
5,279,388 A * 1/1994 Laughlin ................ A63B 27/00 182/92
D351,030 S * 9/1994 Laughlin ........................ D25/69
5,437,377 A * 8/1995 Riemenschneider ........................ A47F 5/0876 248/217.4
D362,382 S 9/1995 Cloud (Continued)

OTHER PUBLICATIONS

U.S. Appl. No. 29/750,835, filed Sep. 16, 2020, Albertyn.
Apex, Pole Step-Aluminum Housing Brochure, www.apexpp.com, pp. 1-3, available as early as Feb. 24, 2021.

*Primary Examiner* — Muhammad Ijaz
(74) *Attorney, Agent, or Firm* — VIA LLP

(57) ABSTRACT

A pole step can include an L-bolt with a first portion extending along a first axis and a second portion extending along a second axis, the second axis substantially perpendicular from the first axis, the first portion comprising a raised key. The pole step can further include a step body comprising a first end wall, a second end wall, a step wall extending between the first end wall and the second end wall, and a passage. The passage can be configured to receive the L-bolt. The step body and L-bolt can be adjustable relative to one another to vary a distance between the first end wall of the step body and the second portion of the L-bolt.

23 Claims, 7 Drawing Sheets

(56) References Cited

U.S. PATENT DOCUMENTS

| | | | | | |
|---|---|---|---|---|---|
| D368,422 | S | | 4/1996 | Jensen | |
| 5,624,007 | A | * | 4/1997 | Mahaffy | E06C 9/04 182/92 |
| 5,743,353 | A | * | 4/1998 | Browning | A63B 27/00 182/92 |
| 5,806,628 | A | * | 9/1998 | Fullam | E04G 21/3276 182/135 |
| D406,906 | S | | 3/1999 | Kinoshita | |
| 5,881,837 | A | * | 3/1999 | Leicht | A63B 27/00 182/92 |
| 5,941,485 | A | * | 8/1999 | Davidson | E04H 12/08 411/340 |
| 5,944,139 | A | * | 8/1999 | Kozial | A63B 27/00 182/92 |
| 5,967,475 | A | * | 10/1999 | Johnson | F41B 5/14 248/217.4 |
| 6,378,822 | B1 | | 4/2002 | Franks | |
| 6,439,343 | B1 | * | 8/2002 | Jorges | E06C 9/04 182/187 |
| 7,134,524 | B2 | * | 11/2006 | Sprague | A01M 31/00 182/92 |
| D579,360 | S | | 10/2008 | Crain et al. | |
| D655,597 | S | * | 3/2012 | Matzek | D8/380 |
| D657,217 | S | | 4/2012 | Chang | |
| 8,387,752 | B2 | | 3/2013 | Lagerstedt | |
| 8,863,900 | B1 | * | 10/2014 | Bolinger | A63B 27/00 182/151 |
| D805,658 | S | * | 12/2017 | Sailer | D25/69 |
| D825,080 | S | * | 8/2018 | Albertyn | D25/69 |
| D828,931 | S | * | 9/2018 | Sailer | D25/69 |
| D828,932 | S | * | 9/2018 | Sailer | D25/69 |
| 10,112,078 | B1 | * | 10/2018 | Sailer | A63B 27/00 |
| D844,179 | S | * | 3/2019 | Sailer | D25/69 |
| 10,335,639 | B2 | * | 7/2019 | Otto | A63B 27/02 |
| 10,954,717 | B2 | * | 3/2021 | Sailer | E06C 7/18 |
| 11,905,759 | B2 | * | 2/2024 | Morris | E06C 1/34 |
| D1,018,900 | S | * | 3/2024 | Albertyn | D25/69 |
| 2002/0029931 | A1 | * | 3/2002 | Bridges | E06C 1/39 182/187 |
| 2002/0066620 | A1 | * | 6/2002 | Lindsey | E06C 9/04 182/92 |
| 2002/0121406 | A1 | * | 9/2002 | Summers | E06C 9/04 182/92 |
| 2005/0151035 | A1 | | 7/2005 | Crain et al. | |
| 2009/0045012 | A1 | * | 2/2009 | Mencl | A63B 27/00 182/92 |
| 2014/0251727 | A1 | * | 9/2014 | Wilmoth | E06C 9/04 182/90 |
| 2015/0196806 | A1 | * | 7/2015 | Wakefield, Jr. | E06C 9/04 182/187 |
| 2015/0290498 | A1 | | 10/2015 | Bussewitz | |
| 2016/0096046 | A1 | * | 4/2016 | Sailer | A62B 35/0068 411/366.1 |
| 2016/0375282 | A1 | * | 12/2016 | Sailer | E06C 7/18 182/90 |
| 2019/0136539 | A1 | * | 5/2019 | Davis | F16B 39/24 |
| 2020/0048964 | A1 | * | 2/2020 | Sailer | E06C 7/18 |
| 2021/0040795 | A1 | * | 2/2021 | Garayev | E06C 9/04 |
| 2021/0277717 | A1 | * | 9/2021 | Morris | E06C 1/34 |
| 2021/0404207 | A1 | * | 12/2021 | Albertyn | E04H 12/24 |
| 2022/0074267 | A1 | * | 3/2022 | Albertyn | E06C 9/04 |
| 2024/0133416 | A1 | * | 4/2024 | Lim | F16B 43/00 |
| 2024/0133417 | A1 | * | 4/2024 | Lim | F16B 33/002 |
| 2024/0328255 | A1 | * | 10/2024 | Wynalda, Jr. | E06C 1/34 |

* cited by examiner

UTILITY POLE STEP

INCORPORATION BY REFERENCE TO ANY PRIORITY APPLICATIONS

This application claims the benefit of U.S. Provisional Application No. 63/075,608, filed Sep. 8, 2020, which is hereby incorporated by reference in its entirety.

Any and all applications for which a foreign or domestic priority claim is identified in the Application Data Sheet as filed with the present application are hereby incorporated by reference under 37 CFR 1.57.

BACKGROUND

Pole steps have been used in the utility industry to mount to a utility pole and allow individuals to climb up a utility pole. Utility poles can be made of steel or composite (fiberglass). Utility poles can be round or multi-sided. The utility poles can include a series of holes configured to receive structures, such as pole steps. Each pole step has to be able to receive an individual's foot and support the weight of an individual.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting on scope.

SUMMARY

Figure 1A:
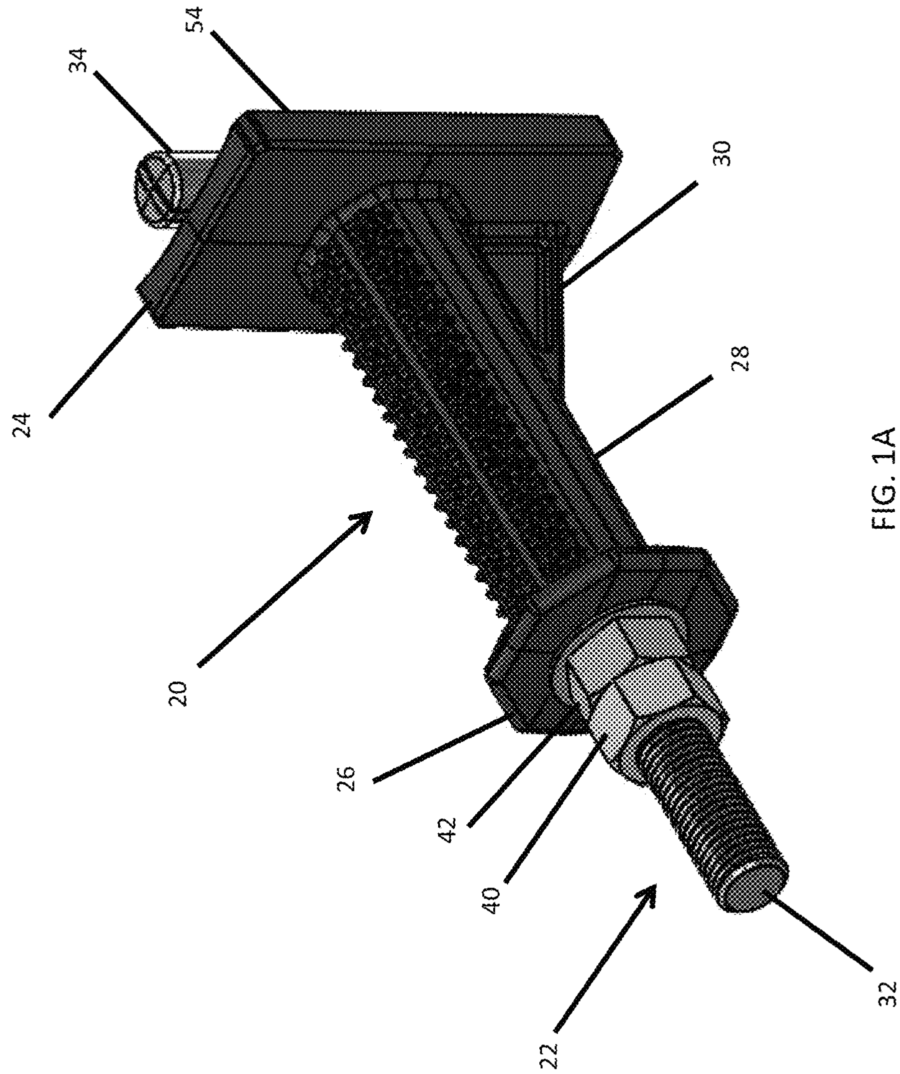
FIG. 1A illustrates a top, rear perspective view of a pole step assembly.
Figure 1B:
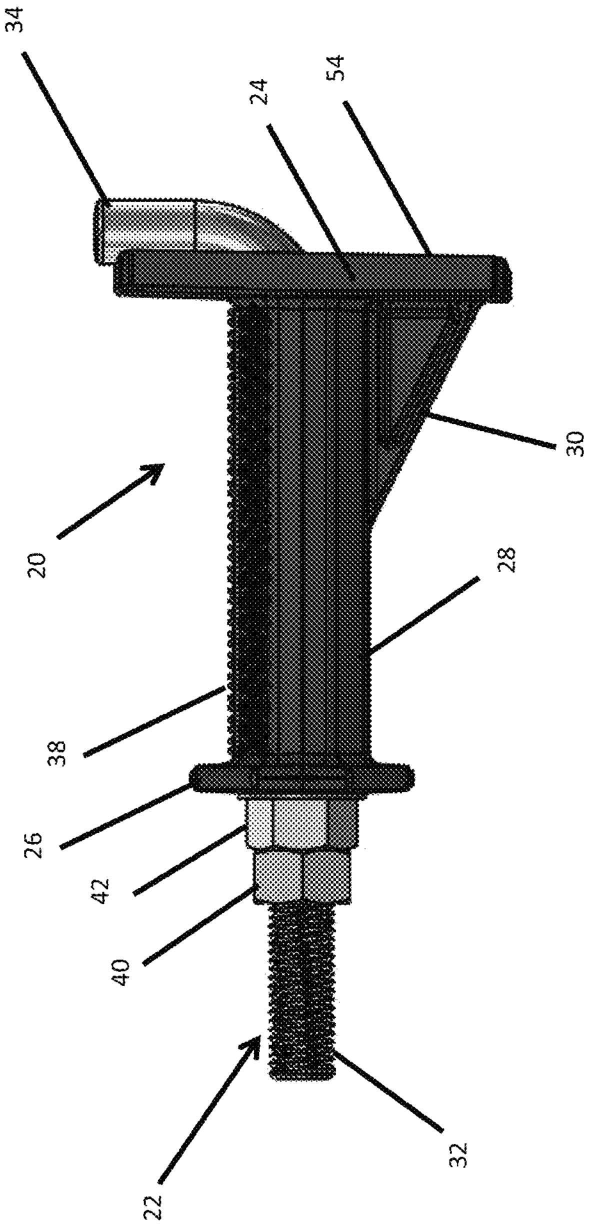
FIG. 1B illustrates a side view of the pole step assembly of FIG. 1A.

The systems, methods and devices of this disclosure each have several innovative aspects, no single one of which is solely responsible for the desirable attributes disclosed herein.

In one aspect, a pole step includes an L-bolt with a first portion extending along a first axis and a second portion extending along a second axis, the second axis substantially perpendicular from the first axis, the first portion comprising a raised key. The pole step can further include a step body with a first end wall, a second end wall, a step wall extending between the first end wall and the second end wall, and a passage. The passage can be configured to receive the L-bolt. The step body and L-bolt can be adjustable relative to one another to vary a distance between the first end wall of the step body and the second portion of the L-bolt.

In some configurations, the first portion can include a thread. The pole step can further include a first nut and a second nut. The first nut and the second nut can be configured to lock the step body relative to the L-bolt in a first direction. The step wall can include eight sides. The step wall can have an upper side. The upper side can include a plurality of ribs. The plurality of ribs can be pointed. The first end wall and the second end wall can each extend above the upper surface of the step wall. The first end wall can be larger than the second end wall. The height of the first end wall can be at least 1.5 times larger than a height of the second end wall. The first end wall can extend around an entire periphery of a first end of the step wall. The second end wall can extend around an entire periphery of a second end of the step wall. The passage of the step body can be a shape configured to receive the raised key of the first portion. The passage can include a plurality of apertures through each of the first end wall, the second end wall, and the step wall. The plurality of apertures through each of the first end wall, the second end wall, and the step wall can be aligned with each other. The step body can be symmetrical about a vertical, central plane that passes lengthwise through the step body. The second end wall can include a curved outwardly-facing surface configured to align with a curved surface of the utility pole. The step body can further include an intermediate wall on a lower side of the step wall and extending downwardly. The intermediate wall can be triangular. The L-bolt can include steel. The step body can include aluminum. The step body can include steel.

DETAILED DESCRIPTION

Embodiments of systems, components and methods of assembly and manufacture are described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIGS. 1A-1E illustrate a pole step assembly, and portions thereof, configured for connection to a hollow pole (e.g., a utility pole) to allow a worker to climb the pole. The pole step assembly can be configured for use with round or 12-sided, hollow steel or composite utility poles, among other possible applications. In some configurations, the pole step assembly includes a step body 20 that is configured to receive a support, such as an L-bolt 22.

Figure 3:
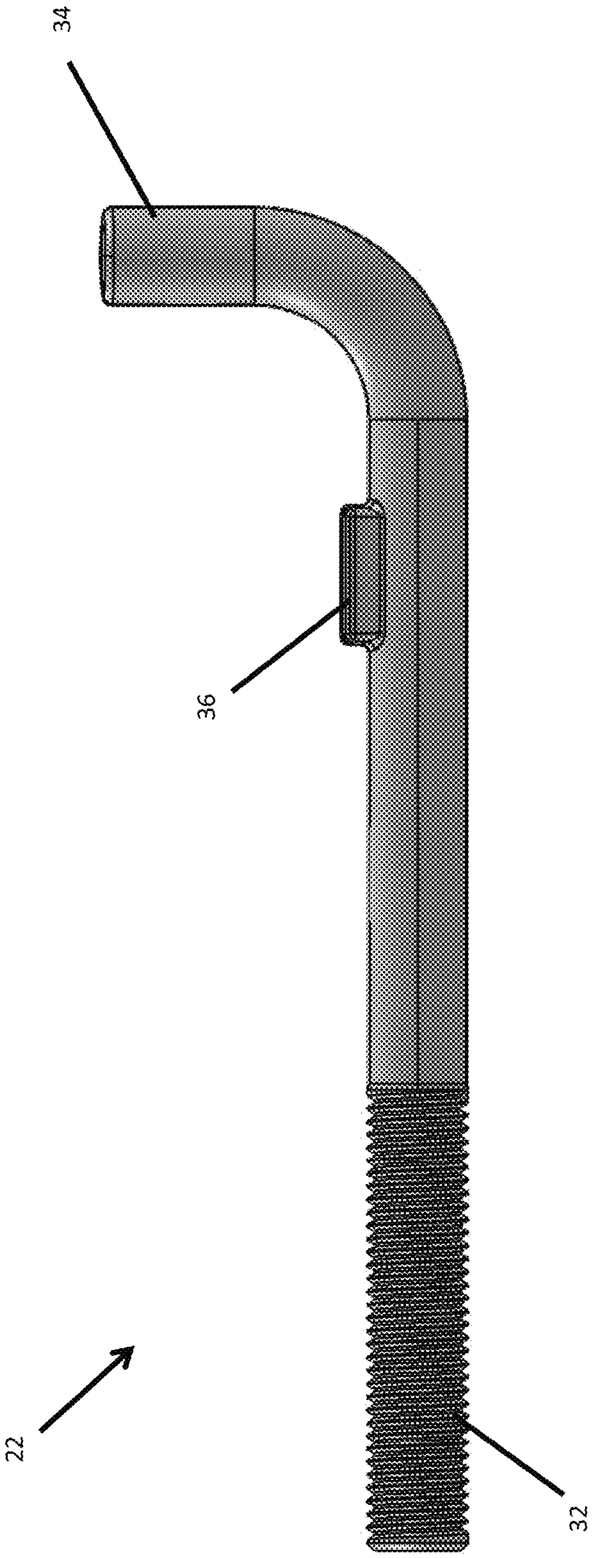
FIG. 3 illustrates a side view of a L-bolt.

FIG. 3 illustrates the L-bolt 22. The L-bolt 22 can have a first portion 32 that extends along a first axis and a second portion 34 that extends along a second axis, the second axis substantially perpendicular from the first axis. The first portion 32 can include a thread along at least a portion or all of the length of the first portion 32. The second portion 34 can be configured to be inserted and positioned within a hole of a utility pole. For example, a utility pole can include hole with a diameter between 1 inch to 2 inches, such as 1 inch or 1 and ⅛ inches. The second portion 32 can have a diameter less than the diameter of the hole of the utility pole, such as ½ inch, ¾ inch, or 1 inch. The L-bolt 22 can be made of any suitable material, such as a metal material (e.g., steel).

Figures 2A, 2B:
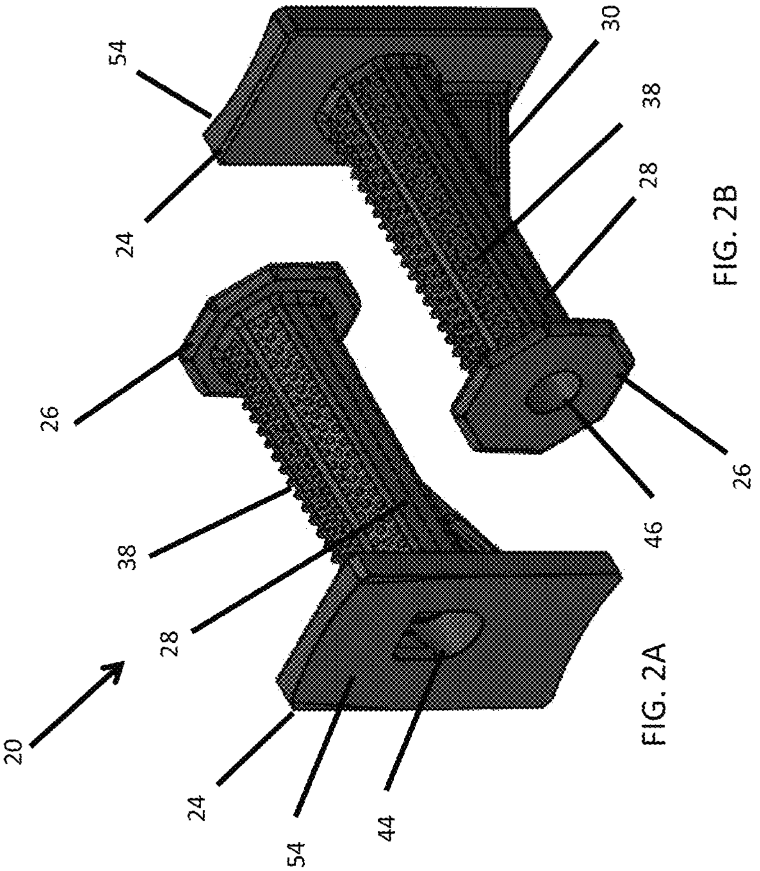
FIG. 2A illustrates a front perspective view of the step body.
FIG. 2B illustrates a rear perspective view of the step body of FIG. 2A.
Figure 2C:
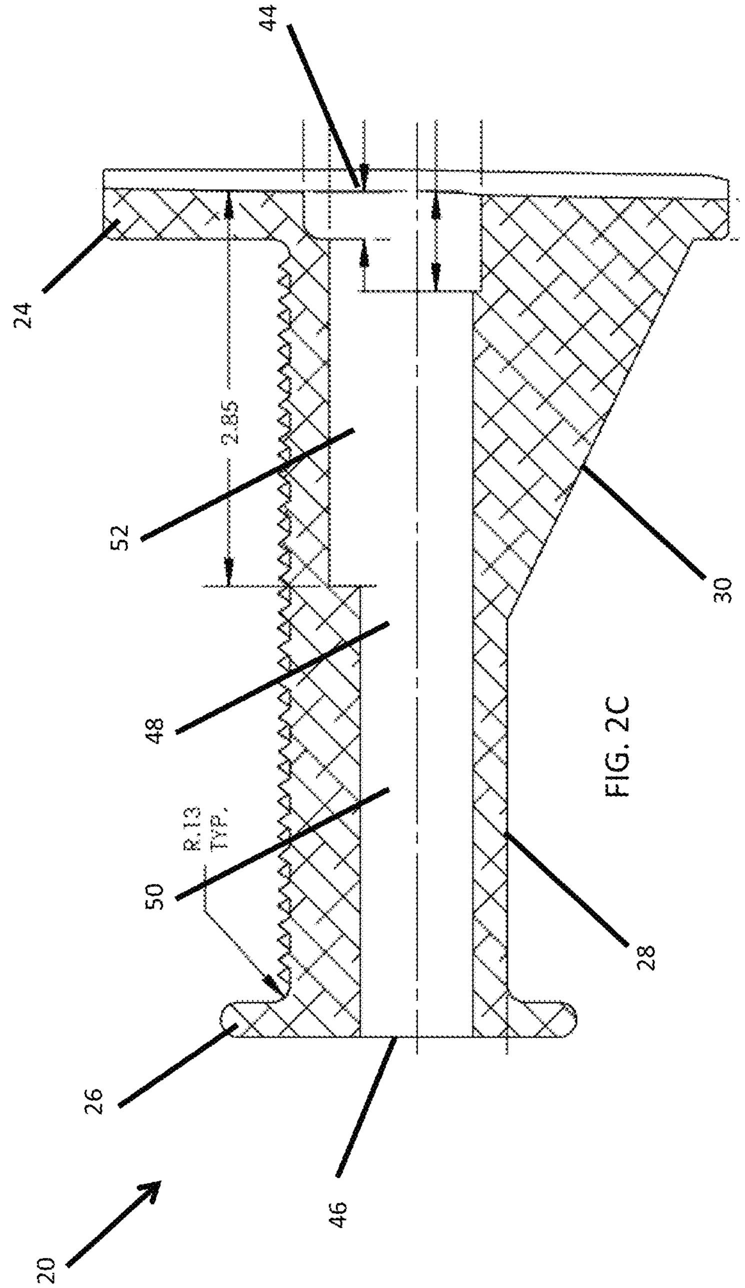
FIG. 2C illustrates a cross sectional view along the longitudinal axis of the step body of FIGS. 2A-2B.

FIGS. 2A-2C illustrate the step body 20. The step body 20 can be made of any suitable material, such as a metal material (e.g., aluminum or powder coated aluminum). In some configurations, the step body 20 can be constructed in whole or in part from metal, such as aluminum or steel, or a plastic or composite material, such as a UV stabilized fiberglass filled composite, for example and without limitation. The illustrated step body 20 includes a first end wall 24, a second end wall 26 and a platform portion or step wall 28 extending between the first end wall 24 and the second end wall 26.

The step body 20 also includes a gusset in the form of an intermediate wall 30 extending downwardly from the step wall 28. The intermediate wall 30 can extend from a lower side of the step wall 28. The intermediate wall 30 can be triangular in shape. The intermediate wall 30 may provide further support to the assembly and the weight applied to the assembly. The intermediate wall 30 can advantageously prevent cracking or fracturing of the step body 20, in particular when an individual's weight is supported by the pole step assembly. In some examples, the pole step assembly can support a weight of up to 3,200 lbs.

When assembled, the step body 20 and the L-bolt 22 can be adjustable relative to one another to vary the distance between the first end wall 24 of the step body 20 and the second portion 34 The first end wall 24 is capable of being spaced from the second portion 34 of the L-bolt 22, the space sufficient to accommodate a thickness of a wall of a hollow pole to which the assembly is mounted. When assembled on a utility pole, the second portion 34 of the L-bolt 22 is inserted into a hole of the utility pole and is positioned along an internal wall of the utility pole. The length of the second portion 34 can extend substantially parallel and against the inner surface of the wall of the utility pole. The first end wall 24 of the step body 20 can be positioned against an outer surface of the wall of the utility pole, substantially parallel to the outer surface of the wall of the utility pole. In this manner, the second portion 34 of the L-bolt 22 and the length of the first end wall 24 of the step body 20 are parallel to each other. The utility wall can therefore be sandwiched or positioned between the step body 20 and the L-bolt 22, such as between the first end wall 24 of the step body 20 and the second portion 34 of the L-bolt 22. The distance between the first end wall 24 of the step body 20 and the second portion 34 of the L-bolt can be adjusted to be tightly fitted against the outer surface of the wall and the inner surface of the wall of the utility pole, respectfully. In some configurations, the wall of the hollow pole is received between the second end wall 24 and the second portion 34 of the L-bolt 22 with little to no additional space such that the hollow pole is held relatively tightly between the step body 20 and the L-bolt 22. In some examples, the assembly can accommodate a wall thickness between 0.1 inches to 2 inches, such as between 0.15 inches to 1.75 inches.

In some examples, the step body 20 can further include a passage that extends through the step body 20, including the first end wall 24, the second end wall 26 and the step wall 28. In some examples, each of the first end wall 24, second end wall 26 and step wall 28 includes an aperture 44, 46, 48, respectively, that are aligned with one another to form the passage. The passage is configured to receive the bolt 22, such as at least the first portion 32 of the bolt 22. An axis passing through the passage or the aligned apertures 44, 46, 48 can be parallel to an upper surface of the step wall 28. When the bolt 22 is inserted into the passage of the step body 20, the first axis of the first portion 32 can be aligned with the axis passing through the passage of the step body 20. When the bolt 22 is inserted into the passage of the step body 20, at least a portion of the first portion 32 of the bolt 22 can extend beyond the step body 20, such that the threaded portion of the first portion 32 is accessible and configured to receive the locking nuts 40, 42. The bolt 22 has a raised key 36 on the top of the bolt shaft or first portion 32 that fits into a key hole in the step body 20 and prevents the bolt 22 from spinning as the assembly is tightened to the pole. The raised key 36 can be substantially square or rectangular. The aperture 44 of the second end wall 26 and the aperture 48 of the step wall 28 is sized and shaped to accommodate the bolt 22 with the raised key 36. The aperture or passage 48 can include a first portion 50 with a first diameter. The aperture or passage 48 can also include a second portion 52 that is a cut out shaped and configured to receive the raised key 36 portion. For example, as shown in the cross-sectional view in FIG. 2C, a height of the second portion 52 can be larger than a height of the first portion 50. The height of the second portion 52 can accommodate the height of the raised key 26 of the raised key 36. The raised height of the second portion 52 can extend only partially along the diameter of the passage 48, such as to accommodate the width of the raised key 36. The central axis of the second portion 52 can be offset from the axis of the first portion 50.

At least portion or an entirety of a shank of the bolt 22 can be threaded to allow one or more locking nuts 40, 42 to be employed to secure the bolt 22 and step body 20 to a pole in a known manner. The locking nuts 40, 42 can be used to secure the step body 20 to the bolt 22 in at least a first direction, such that the step body 20 is prevented from moving in a first direction towards or off of the first portion 32. With the bolt 22 passed through the apertures 44, 46, 48 of the walls 24, 26, 28 and with locking nut(s) 40, 42 installed, the bolt 22 is secured to the step body 20 as an assembly to prevent the parts from separating during installation.

Figure 1D:
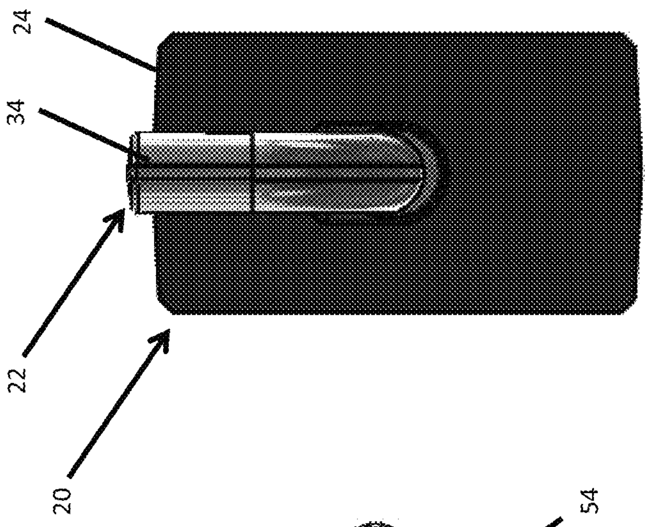
FIG. 1D illustrates a front view of the pole step assembly of FIGS. 1A-1C.
Figure 1C:
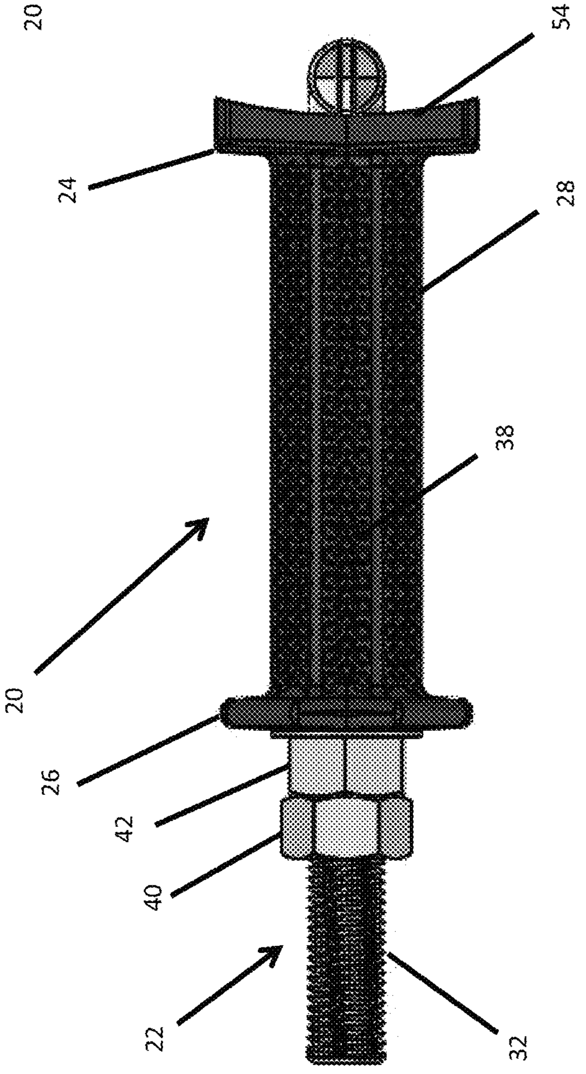
FIG. 1C illustrates a top view of the pole step assembly of FIGS. 1A-1B.
Figure 1E:
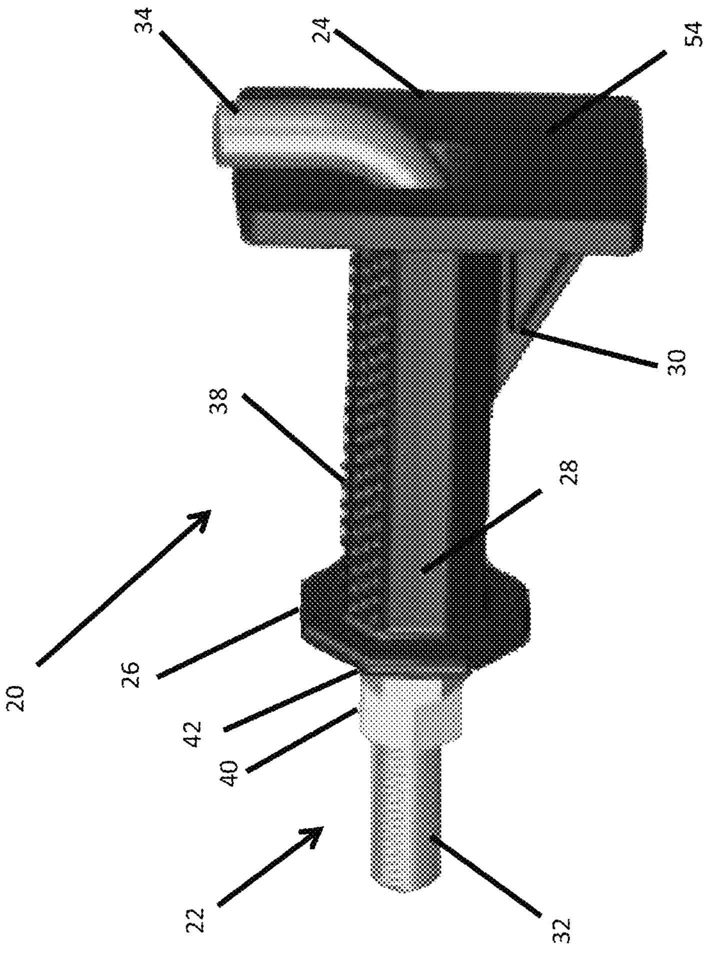
FIG. 1E illustrates a front perspective view of the pole step assembly of FIGS. 1A-1D.

One or both of the end walls 24, 26 can extend above an upper surface of the step wall 28 to provide protection from an individual's foot from slipping off either end of the step body 20. In some examples, the first end wall 24 can be larger than the second end wall 26. For example, the first end wall 24 can have a height that is at least 1.5 times or 2 times larger than the height of the second end wall 26. Further, the first end wall 24 can be rectangular or square shaped, such as when viewed from the front, such as shown in FIG. 1D. The second end wall 26 can be octagonal shaped, such as when viewed from the rear. The first end wall 24 can each extend radially outward from the first end of the step wall 28 or around the entire periphery of the first end of the step wall 28. The second end wall 26 can each extend radially outward from the second end of the step wall 28 or around the entire periphery of the second end of the step wall 28. The first end wall 24 and the second end wall 26 help maintain or secure an individual's foot, in particular when an individual places one or both of their feet on a side surface of the step wall 28.

The upper surface of the step wall 28 can include a plurality of ribs 38 or spikes or serrations. The ribs 38 can be positioned on one or more of the top surface, the front surface and the back surface of the step wall 28. In some configurations, the ribs 38 are provided only on the top surface and, in other configurations, the ribs 38 are provided on all of the surfaces. In some examples, the step wall 28 can be multi-sided. In some examples, the step wall 28 can have 8 sides or surfaces. An individual can place one or both of their feet on a top side or surface of the step wall 28. An individual could also place their one or both of their feet on a side surface, such that the user could lean back and support their weight by leaning on a side surface of the step wall 28. In some configurations, the top surfaces of the three top sides can have ribs or protrusions 38. In other configurations, any combination of the sides can have ribs or protrusions 38. In some configurations, the protrusions 38 can be pointed or point-like projections in contrast to elongate ribs. In some configurations, the ribs or protrusions 38 can be substantially the same height as one another so the ends provide a flat surface to provide increased contact area.

In some configurations, the step body 20 has a width of about 1.5 or 2 inches to provide a comfortable platform with a relatively large surface area compared to existing pole steps for reduced pressure on the user's foot. In addition, the material of the step body 20 can be selected for characteristics (e.g., durometer) that increase comfort. In each illustrated embodiment, the step body 20 is symmetrical about a vertical, central plane that passes lengthwise through the step body 20.

The first wall 24 can have an outwardly-facing surface 54 configured to face and be positioned adjacent to the pole. The outwardly-facing surface 54 of the first end wall 24 (the surface facing the pole) can be curved to help properly align the step body 20 with a curved surface of the pole in a rotational direction about an axis of the bolt 22. Together with the keyed connection between the step body 20 and the bolt 22, such an arrangement maintains the return or second portion 34 of the bolt 22 in an upright orientation to prevent the bolt 22 from inadvertently disengaging from the pole.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A pole step, comprising:

an L-bolt with a first portion extending along a first axis and a second portion extending along a second axis, the second axis substantially perpendicular from the first axis, the first portion comprising a raised key;

a step body comprising a first end wall, a second end wall, a step wall extending between the first end wall and the second end wall, ands a passage that forms an opening in the first end wall;

wherein the raised key is fixed on the first portion of the L-bolt and comprises a fixed height extending radially from the first axis beyond a surrounding surface of the L-bolt;

wherein the passage is configured to receive the L-bolt, wherein the passage comprises a key portion configured to receive the raised key; and wherein the key portion forms a portion of the opening in the first end wall;

wherein the step body and the L-bolt are adjustable relative to one another to vary a distance between the first end wall of the step body and the second portion of the L-bolt.

2. The pole step of claim 1, wherein the first portion comprises a thread.

3. The pole step of claim 1, further comprising a first nut and a second nut, the first nut and the second nut configured to lock the step body relative to the L-bolt in a first direction.

4. The pole step of claim 1, wherein the step wall comprises eight sides.

5. The pole step of claim 1, wherein the step wall comprises an upper side.

6. The pole step of claim 5, wherein the upper side comprises a plurality of ribs.

7. The pole step of claim 6, wherein the plurality of ribs are pointed.

8. The pole step of claim 5, wherein the first end wall and the second end wall each extend above the upper side of the step wall.

9. The pole step of claim 1, wherein the first end wall is larger than the second end wall.

10. The pole step of claim 1, wherein a height of the first end wall is at least 1.5 times larger than a height of the second end wall.

11. The pole step of claim 1, wherein the first end wall extends around an entire periphery of a first end of the step wall, and wherein the second end wall extends around an entire periphery of a second end of the step wall.

12. The pole step of claim 1, wherein the passage comprises a plurality of apertures through each of the first end wall, the second end wall, and the step wall, wherein the plurality of apertures through each of the first end wall, the second end wall, and the step wall are aligned with each other.

13. The pole step of claim 1, wherein the step body is symmetrical about a vertical, central plane that passes lengthwise through the step body.

14. The pole step of claim 1, wherein the second end wall comprises a curved outwardly-facing surface configured to align with a curved surface of a utility pole.

15. The pole step of claim 1, wherein the step body further comprises an intermediate wall on a lower side of the step wall and extending downwardly.

16. The pole step of claim 15, wherein the intermediate wall is triangular.

17. The pole step of claim 1, wherein the L-bolt comprises steel.

18. The pole step of claim 1, wherein the step body comprises aluminum.

19. The pole step of claim 1, wherein the step body comprises steel.

20. The pole step of claim 1, wherein an end surface of the second end wall defines an end-most extent of the step body.

21. A pole step, comprising:

an L-bolt with a first portion extending along a first axis and a second portion extending along a second axis, the second axis substantially perpendicular from the first axis, the first portion comprising a raised key;

a step body comprising a first end wall, a second end wall, a step wall extending between the first end wall and the second end wall, and a passage;

wherein the raised key is fixed on the first portion of the L-bolt and comprises a fixed height extending radially from the first axis beyond a surrounding surface of the L-bolt;

wherein the passage is configured to receive the L-bolt, wherein the passage comprises a key portion configured to receive the raised key and to restrict relative rotation between the L-bolt and the step body;

wherein the key portion of the passage is at least partially located within the step wall; and wherein the step body and the L-bolt are adjustable relative to one another along a continuous range to vary a distance between the first end wall of the step body and the second portion of the L-bolt.

22. The pole step of claim 21, wherein the raised key extends in a same direction as the second portion of the L-Bolt.

23. The pole step of claim 21, wherein the raised key and the L-bolt are formed in one piece.

* * * * *